US009970499B2

(12) United States Patent
Yamasaki et al.

(10) Patent No.: US 9,970,499 B2
(45) Date of Patent: May 15, 2018

(54) ELECTRIC LINEAR MOTION ACTUATOR AND ELECTRIC BRAKE SYSTEM

(71) Applicant: NTN CORPORATION, Osaka (JP)

(72) Inventors: Tatsuya Yamasaki, Shizuoka (JP); Makoto Muramatsu, Shizuoka (JP); Yui Masuda, Shizuoka (JP)

(73) Assignee: NTN CORPORATION, Osaka (JP)

( * ) Notice: Subject to any disclaimer, the term of this patent is extended or adjusted under 35 U.S.C. 154(b) by 0 days. days.

(21) Appl. No.: 14/896,050

(22) PCT Filed: Jun. 12, 2014

(86) PCT No.: PCT/JP2014/065567
§ 371 (c)(1),
(2) Date: Dec. 4, 2015

(87) PCT Pub. No.: WO2014/200052
PCT Pub. Date: Dec. 18, 2014

(65) Prior Publication Data
US 2016/0131212 A1 May 12, 2016

(30) Foreign Application Priority Data

Jun. 13, 2013 (JP) ................................ 2013-124716

(51) Int. Cl.
*F16D 55/226* (2006.01)
*F16D 65/18* (2006.01)
(Continued)

(52) U.S. Cl.
CPC ........... *F16D 65/18* (2013.01); *F16D 55/225* (2013.01); *F16D 65/183* (2013.01);
(Continued)

(58) Field of Classification Search
CPC ...... F16D 55/226; F16D 63/006; F16D 65/18; F16D 2121/24; F16D 2125/36; F16D 2125/40
(Continued)

(56) References Cited

U.S. PATENT DOCUMENTS 4,037,678 A * 7/1977 Braune .................. B62D 53/04
180/11
4,356,897 A * 11/1982 Urban ................... F16D 55/224
188/1.11 W
(Continued)

FOREIGN PATENT DOCUMENTS

EP       1 985 883    10/2008
JP       7-113454     5/1995
(Continued)

OTHER PUBLICATIONS

International Search Report dated Sep. 9, 2014 in corresponding International Application No. PCT/JP2014/065567 (with English translation).
(Continued)

*Primary Examiner* — Christopher P Schwartz
(74) *Attorney, Agent, or Firm* — Wenderoth, Lind & Ponack, L.L.P.

(57) ABSTRACT

The electric linear motion actuator includes an electric motor, a drive shaft configured to be rotated by the electric motor, a rotation-to-linear motion converting mechanism configured to convert the rotational motion of the drive shaft to the axial linear motion of an axially movably supported outer ring member, and an electric locking mechanism incorporated in a reduction gear mechanism in which the rotation of a rotor shaft of the electric motor is reduced in speed and transmitted to the drive shaft. When the electric locking mechanism is energized, the power transmission path shifts to the locked state in which power cannot be
(Continued)

transmitted, and when the electric locking mechanism is de-energized thereafter, the power transmission path is kept in the locked state. The electric locking mechanism is built in a motor case of the electric motor so that the electric motor and the electric locking mechanism are unitized.

14 Claims, 7 Drawing Sheets

(51) Int. Cl.
*H02K 7/06* (2006.01)
*H02K 7/116* (2006.01)
*F16D 55/225* (2006.01)
*F16H 25/22* (2006.01)
*F16H 25/24* (2006.01)
*F16D 121/24* (2012.01)
*F16D 125/50* (2012.01)

(52) U.S. Cl.
CPC ..... *F16H 25/2252* (2013.01); *F16H 25/2454* (2013.01); *H02K 7/06* (2013.01); *H02K 7/116* (2013.01); *F16D 2121/24* (2013.01); *F16D 2125/50* (2013.01)

(58) Field of Classification Search
USPC .................................. 188/2 D, 156–164, 265
See application file for complete search history.

(56) References Cited

U.S. PATENT DOCUMENTS

| | | | |
|---|---|---|---|
| 5,584,214 A | 12/1996 | Hayashi et al. | |
| 6,244,394 B1 * | 6/2001 | Gutierrez | B60T 7/107 188/156 |
| 6,405,836 B1 | 6/2002 | Rieth et al. | |
| 2005/0000762 A1 * | 1/2005 | Powrozek | B60T 7/107 188/162 |
| 2005/0217952 A1 * | 10/2005 | Usui | F16D 65/18 188/265 |
| 2008/0011560 A1 | 1/2008 | Yamaguchi et al. | |
| 2009/0090610 A1 * | 4/2009 | Grimm | B60T 7/085 200/520 |
| 2010/0051395 A1 | 3/2010 | Sano et al. | |
| 2010/0319477 A1 | 12/2010 | Tateishi et al. | |
| 2010/0320043 A1 * | 12/2010 | Yamasaki | F16D 65/18 188/162 |
| 2011/0247904 A1 | 10/2011 | Yamasaki | |
| 2013/0112022 A1 | 5/2013 | Shimizu | |
| 2013/0186717 A1 * | 7/2013 | Muramatsu | F16D 55/226 188/72.1 |
| 2014/0000992 A1 | 1/2014 | Tajima et al. | |
| 2014/0182980 A1 | 7/2014 | Muramatsu et al. | |

FOREIGN PATENT DOCUMENTS

| | | |
|---|---|---|
| JP | 2002-506179 | 2/2002 |
| JP | 2002-186115 | 6/2002 |
| JP | 2008-8476 | 1/2006 |
| JP | 2010-054010 | 3/2010 |
| JP | 2010-65777 | 3/2010 |
| JP | 2010-90959 | 4/2010 |
| JP | 2011-57011 | 3/2011 |
| JP | 2012-87889 | 5/2012 |
| JP | 2012-193805 | 10/2012 |
| WO | 2010/060725 | 6/2010 |
| WO | 2013/024747 | 2/2013 |

OTHER PUBLICATIONS

Written Opinion of the International Searching Authority dated Sep. 9, 2014 in corresponding International Application No. PCT/JP2014/065567 (with English translation).
Extended European Search Report dated May 10, 2016 in corresponding European Application No. 14811512.4.
Office Action dated Aug. 22, 2017 in Japanese Patent Application No. 2013-124716, with partial English-language translation.

* cited by examiner

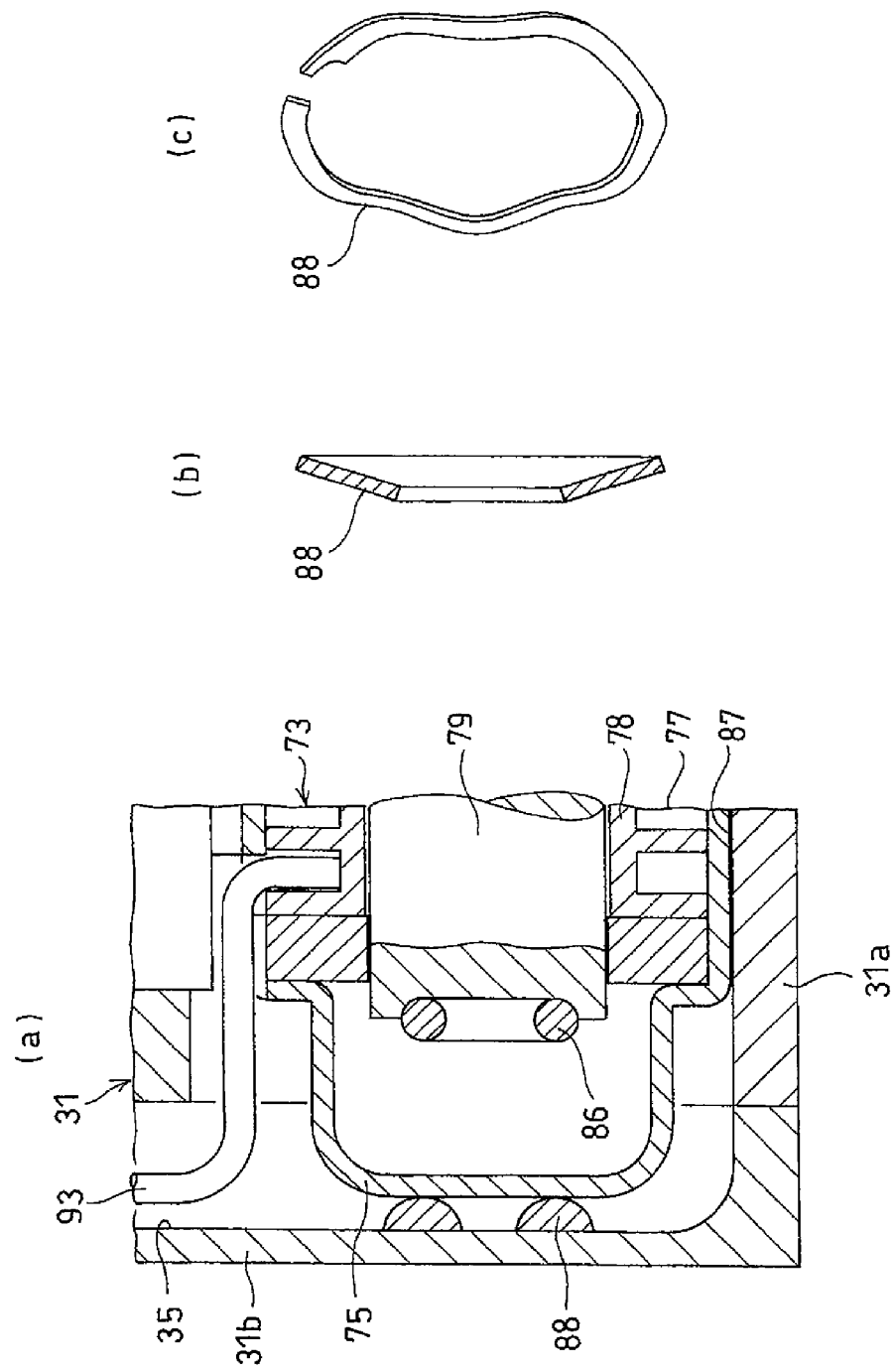

ELECTRIC LINEAR MOTION ACTUATOR AND ELECTRIC BRAKE SYSTEM

TECHNICAL FIELD

The present invention relates to an electric linear motion actuator for linearly driving a driven member such as a brake pad, and to an electric brake system in which this electric linear motion actuator is used.

BACKGROUND ART

As electric linear motion actuators of this type including an electric motor as a driving source, electric linear motion actuators as disclosed in the below-identified Patent documents 1 and 2 are known.

In the electric linear motion actuators disclosed in Patent documents 1 and 2, planetary rollers are incorporated between a rotary shaft configured to be rotated by an electric motor and an axially movably supported outer ring member, when the rotary shafts rotates, the respective planetary rollers rotate about their axes while revolving around the rotary shaft due to the frictional contact of the planetary rollers with the rotary shaft, and a helical rib formed on the inner diameter surface of the outer ring member engages in a helical groove or circumferential grooves formed in the outer diameter surface of each planetary roller, thereby moving the outer ring member in the axial direction.

The electric brake systems in which the electric linear motion actuators disclosed in Patent documents 1 and 2 are incorporated have only a service brake function for controlling a braking force according to how much the driver of the vehicle operates the brake pedal. As a result thereof, since while the vehicle is parked, a braking force needs to be maintained by keeping the electric motor energized, there is the disadvantage that the power consumption of the electric motor is large.

In order to overcome this disadvantage, the applicant of the present invention has already proposed in the below-identified Patent document 3 an electric linear motion actuator capable of maintaining a braking force even while an electric motor is de-energized.

The electric linear motion actuator disclosed in Patent document 3 includes a reduction gear mechanism in which the rotation of a rotor shaft of an electric motor is reduced in speed and transmitted to a rotary shaft. The reduction gear mechanism is constituted by a plurality of gears, and one of the gears is formed in its side surface with a plurality of circumferentially spaced apart engagement portions. By activating a linear solenoid, a locking pin movable toward and away from one of the engagement portions advances so as to engage in one of the engagement portions and thus to lock the one of the gears formed with the engagement portions, thereby making it possible to maintain a braking force even while the electric motor is de-energized.

By using in an electric brake system such an electric linear motion actuator as described above, while the vehicle is parked, it is possible to lock brake pads with the brake pads pressed against a disk rotor by a predetermined pressing force, and to make the electric linear motion actuator small-sized.

PRIOR ART DOCUMENT(S)

Patent Document(s)

Patent document 1: Japanese Unexamined Patent Application Publication No. 2010-65777

Patent document 2: Japanese Unexamined Patent Application Publication No. 2010-90959

Patent document 3: Japanese Unexamined Patent Application Publication No. 2012-87889

SUMMARY OF THE INVENTION

Problems to be Solved by the Invention

In the electric linear motion actuator disclosed in Patent document 3, since the linear solenoid for parking brake is a member formed separately from the electric motor, in order to assemble the electric linear motion actuator, it is necessary to separately attach the respective electric components to the electric linear motion actuator, and to arrange a power line or lines after the attachment of the respective electric components. As a result thereof, it takes a lot of time to assemble the electric linear motion actuator, and thus it was necessary to take a measure so as to assemble the electric linear motion actuator easily.

Since the linear solenoid is attached to the electric linear motion actuator so as to be exposed to outside, waterproof treatment needs to be performed to the linear solenoid. As a result thereof, costs are high, and thus it was also necessary to take a measure so as to reduce costs.

It is an object of the present invention to easily assemble an electric linear motion actuator having a parking brake function.

Means for Solving the Problems

In order to achieve the above object, the present invention provides an electric linear motion actuator comprising: an electric motor having a motor case; a drive shaft configured to be rotated by the electric motor; a rotation-to-linear motion converting mechanism configured to convert a rotational motion of the drive shaft to an axial linear motion of an axially movably supported sliding member; and an electric locking mechanism incorporated in a power transmission path through which power is transmitted from the electric motor to the drive shaft, wherein the locking mechanism is configured, when energized, to shift the power transmission path to a locked state in which power cannot be transmitted through the power transmission path, and configured, when de-energized thereafter, to keep the power transmission path in the locked state, characterized in that the electric locking mechanism is built in the motor case of the electric motor so that the electric motor and the electric locking mechanism are unitized.

The present invention also provides an electric brake system comprising: a brake pad; a disk rotor; and an electric linear motion actuator configured to linearly drive the brake pad such that the brake pad is pressed against the disk rotor, thereby applying a braking force to the disk rotor, characterized in that the electric linear motion actuator comprises the above-described electric linear motion actuator according to the present invention.

In the electric brake system configured as above, when the electric motor of the electric linear motion actuator is driven so as to rotate the drive shaft, the rotation of the drive shaft is converted to the axial linear motion of the sliding member by the rotation-to-linear motion converting mechanism and transmitted to the sliding member. As a result thereof, the sliding member linearly moves so that the brake pad coupled to the sliding member is pressed against the disk rotor, thereby applying a braking force to the disk rotor.

When the vehicle is parked, with the brake pad pressed against the disk rotor so that the braking force necessary for parking is applied to the disk rotor as described above, the electric locking mechanism is energized and activated so that the power transmission path shifts to the locked state in which power cannot be transmitted through the power transmission path. While the power transmission path is locked, the electric motor and the electric locking mechanism are de-energized so as to reduce the wasteful consumption of electric energy.

In the electric linear motion actuator according to the present invention, since the electric locking mechanism is built in the motor case of the electric motor so that the electric motor and the electric locking mechanism are unitized, the attachment of the electric motor and the electric locking mechanism to the actuator is performed at the same time. Therefore, it is possible to assemble the electric linear motion actuator very easily.

Since the electric locking mechanism is received in the motor case, by performing waterproof treatment to the electric motor, the electric locking mechanism is also made waterproof. As a result thereof, it is not necessary to separately perform waterproof treatment to the electric locking mechanism, thus making it possible to reduce costs.

By connecting a power line of the electric motor and a power line of the electric locking mechanism to a single multicore cable, it is possible to simplify the arrangement (layout) of the respective lines, and thus to assemble the electric linear motion actuator more easily.

The electric locking mechanism may comprises: a locking pin movable toward and away from one point on a rotation trajectory circle of an engagement portion formed in a side surface of a rotary member for transmitting power; and a linear solenoid configured to move the locking pin toward and away from said one point.

If the linear solenoid is inserted and supported in a solenoid receiving hole formed in the motor case, the linear solenoid might rotate due to vibration, etc. so as to generate the torsion of the power line connected to the linear solenoid, thereby leading to the disconnection of the power line. In order to prevent the disconnection of the power line, it is preferable that an anti-rotation means is provided between the linear solenoid and the motor case.

If the anti-rotation means comprises: an axial engagement groove formed in an inner periphery of a solenoid receiving hole formed in the motor case; and an anti-rotation protrusion formed on an outer periphery of the linear solenoid and engaged in the engagement groove, it is possible to rotationally fix the linear solenoid concurrently with the insertion of the linear solenoid in the solenoid receiving hole.

In the electric linear motion actuator configured as above, if the power line of the electric locking mechanism comprises a power line of the linear solenoid extending in the engagement groove, it is possible to effectively utilize the engagement groove.

In the electric linear motion actuator according to the present invention, if the actuator further comprises an elastic member provided in an interior of the motor case, and configured to axially press a tail portion of the linear solenoid, it is possible to prevent the linear solenoid from moving backward. Therefore, it is possible to always keep constant the relative position relation between the locking pin and the engagement portion, and thus to reliably move the locking pin out of the engagement portion. Also, the elastic deformation of the elastic member can absorb the impact force generated when a plunger of the linear solenoid moves backward and stops due to the pressing force of a return spring.

In this case, the elastic member may comprise one of a member made of rubber, a disk spring, and a wave spring.

Effects of the Invention

In the electric linear motion actuator according to the present invention, since the electric locking mechanism configured, when energized, to keep the power transmission path in the locked state in which power cannot be transmitted through the power transmission path is built in the motor case of the electric motor so that the electric motor and the electric locking mechanism are unitized, the attachment of the electric motor and the electric locking mechanism to the actuator is completed at the same time. Therefore, it is possible to assemble the electric linear motion actuator very easily.

Since the electric locking mechanism is received in the motor case, it is not necessary to separately perform waterproof treatment to the electric locking mechanism. As a result thereof, it is possible to reduce costs.

BRIEF DESCRIPTION OF THE DRAWINGS

FIG. 8(*a*) is an enlarged sectional view of the tail portion of the linear solenoid illustrated in FIG. 4.

FIG. 8(*b*) is a sectional view of a different elastic member.

FIG. 8(*c*) is a perspective view of a still different elastic member.

BEST MODE FOR CARRYING OUT THE INVENTION

Figure 1:
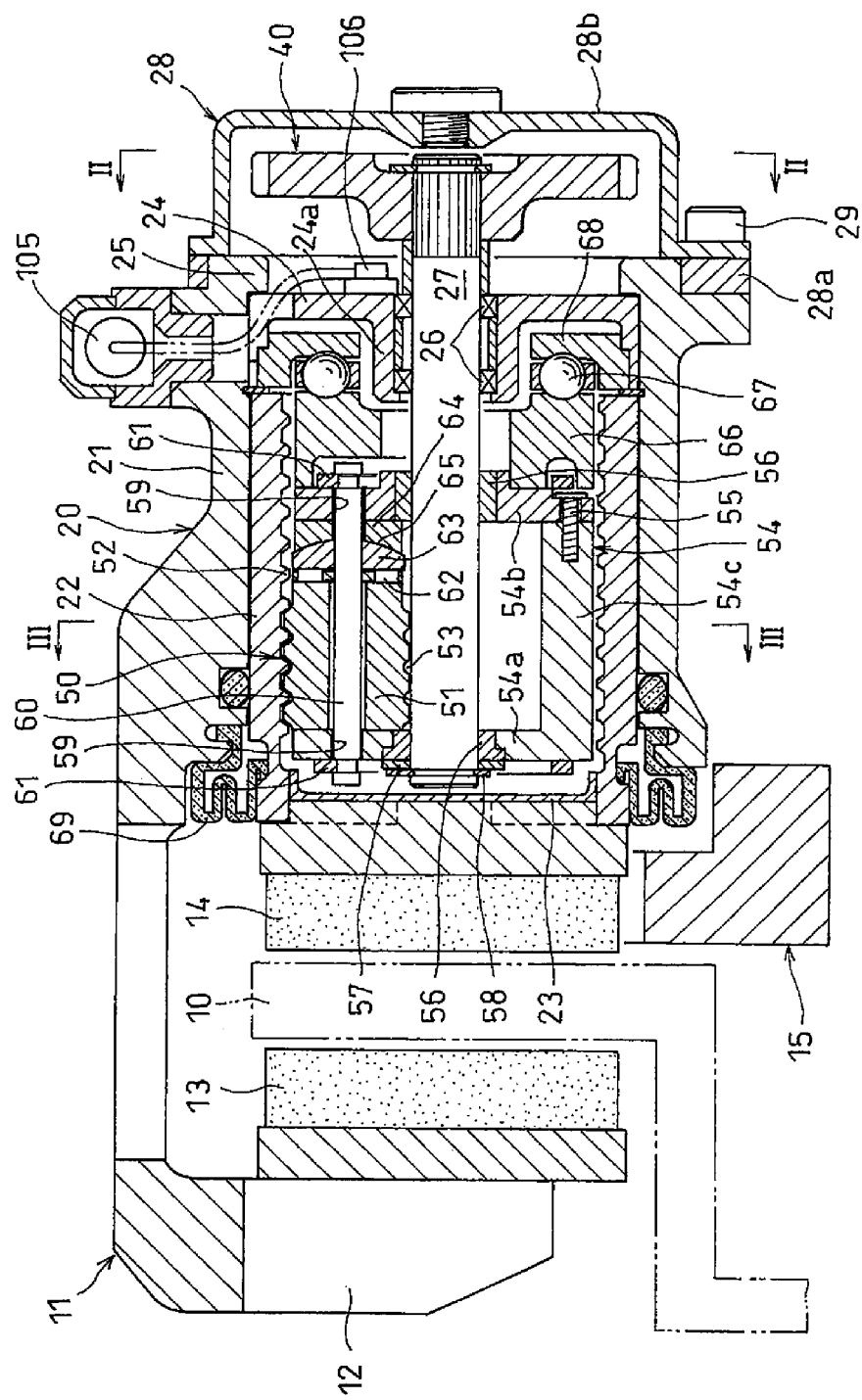
FIG. 1 is a longitudinal sectional view illustrating an embodiment of an electric brake system in which an electric linear motion actuator according to the present invention is used.
Figure 2:
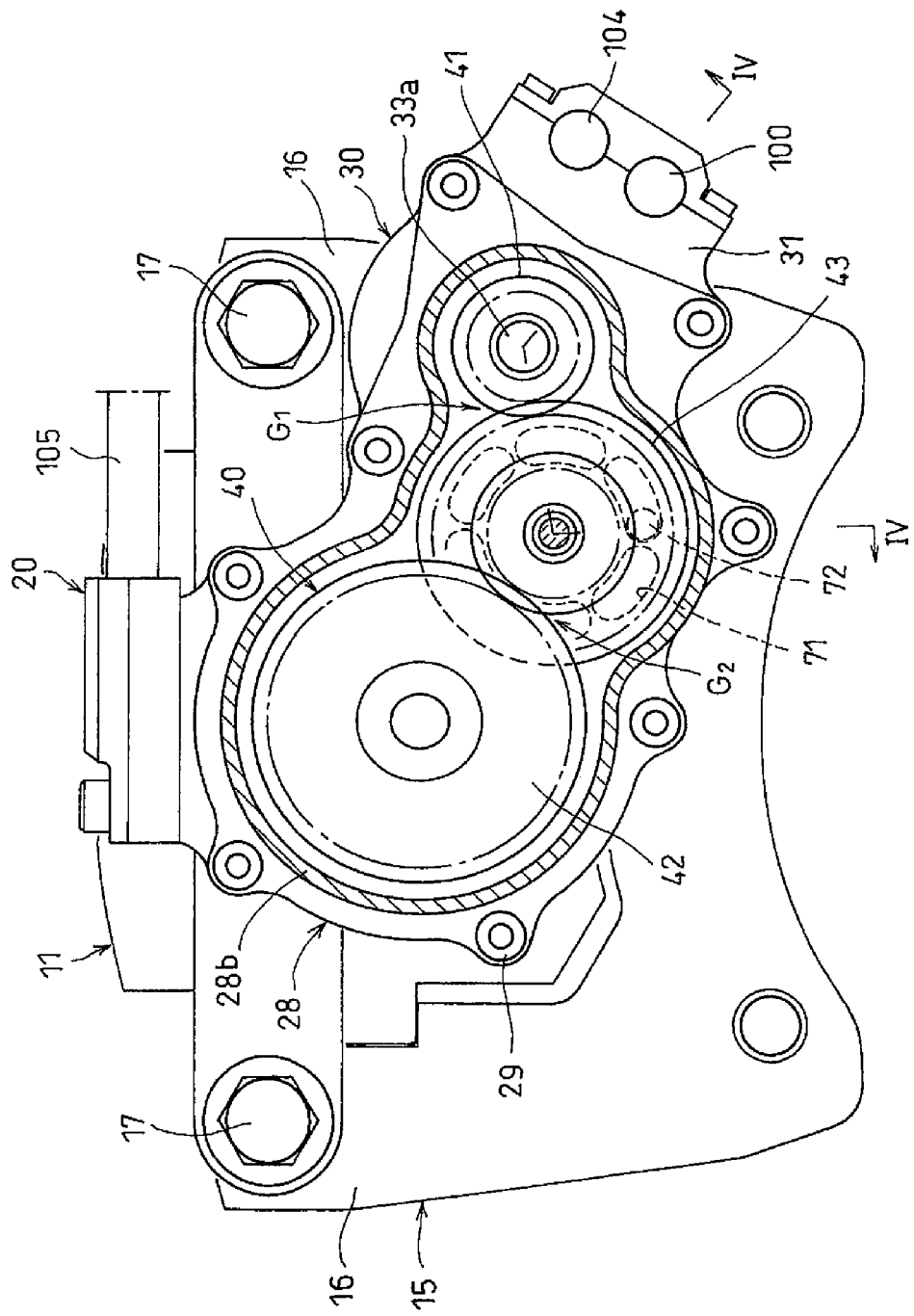
FIG. 2 is a sectional view taken along line II-II of FIG. 1.
Figure 3:
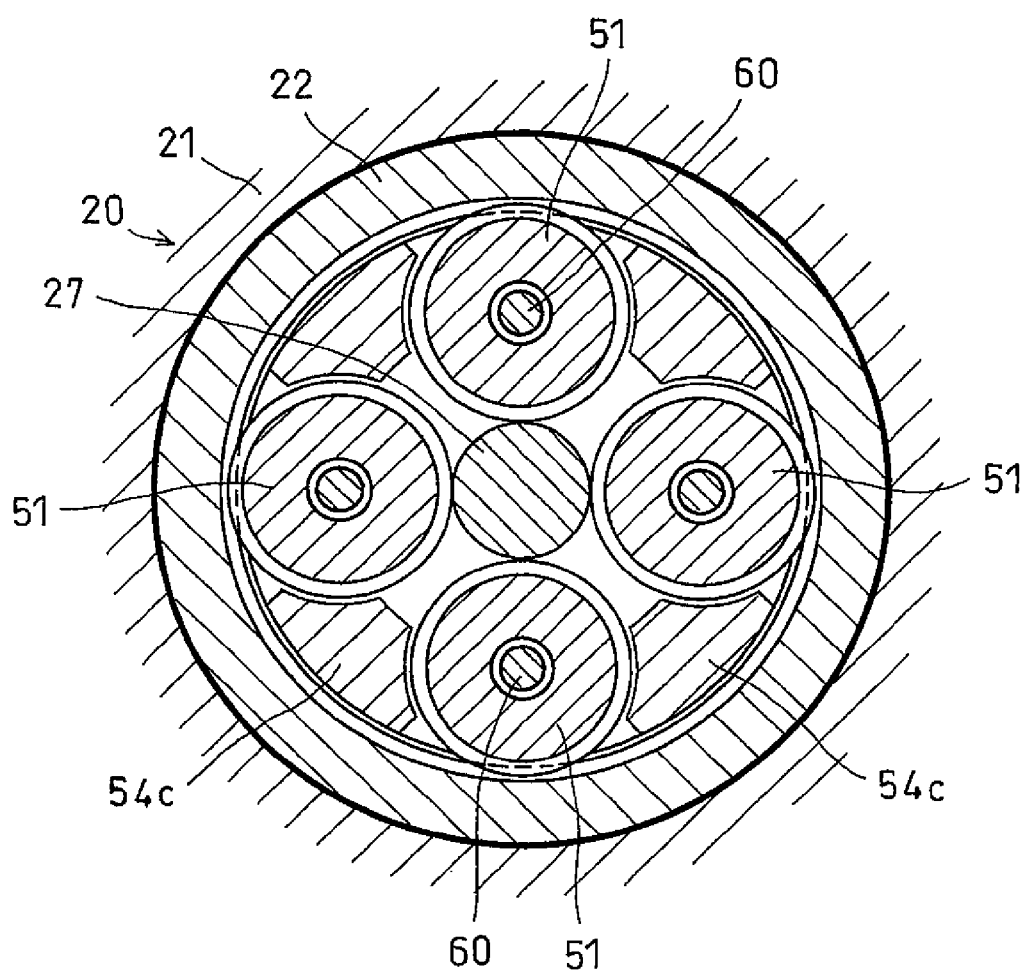
FIG. 3 is a sectional view taken along line III-III of FIG. 1.

The embodiment of the present invention is now described with reference to the drawings. As illustrated in FIGS. 1 and 2, the electric brake system of the embodiment includes a caliper 11 provided so as to surround the outer periphery of a disk rotor 10 configured to rotate together with a wheel (not shown), and having a claw portion 12 provided at one end portion of the caliper 11 so as to be axially opposed to the outer peripheral portion of the outboard side surface of the disk rotor 10, and an outboard brake pad 13 supported by the claw portion 12.

The electric brake system further includes an inboard brake pad 14 arranged so as to be opposed to the outer peripheral portion of the inboard side surface of the disk rotor 10, and an electric linear motion actuator 20 provided at the other end portion of the caliper 11 and configured to move the inboard brake pad 14 toward the disk rotor 10.

A mount 15 is provided near the outer peripheral portion of the disk rotor 10. The mount 15 is supported by a knuckle so as to be fixed in position, and is provided on both side portions of the mount 15 with a pair of pin supporting pieces 16 opposed to each other. The pin supporting pieces 16 are each provided with a slide pin 17 extending in the direction orthogonal to the disk rotor 10. The caliper 11 is slidably supported by the slide pins 17.

As illustrated in FIG. 1, the electric linear motion actuator 20 includes a cylindrical housing 21 integral with the other end portion of the caliper 11. An outer ring member 22 as a sliding member is incorporated in the housing 21. The outer ring member 22 is supported so as to be slidable in the axial direction along the inner diameter surface of the housing 21. An opening of the outer ring member 22 at its outboard end portion is closed by a cap 23 mounted to the outer ring member 22. A protrusion formed on the inboard brake pad 14 engages in an engagement groove formed in the outboard end portion of the outer ring member 22 so that the outer ring member 22 is rotationally fixed to the housing 21.

A shaft supporting member 24 is incorporated in the housing 21 so as to be located on the inboard side of the inboard end portion of the outer ring member 22. The shaft supporting member 24 is a disk-shaped member having a boss portion 24a at its center. An annular protrusion 25 is formed on the inner periphery of the inboard end portion of the housing 21 so as to prevent the shaft supporting member 24 from being moved out of the inboard end portion of the housing 21.

A pair of rolling bearings 26 are incorporated in the boss portion 24a of the shaft supporting member 24 so as to be axially spaced apart from each other, and rotatably support a drive shaft 27 arranged on the center axis of the outer ring member 22.

The inboard end portion of the drive shaft 27 is located in a gear case 28 attached to the inboard end portion of the hosing 21. The gear case 28 is constituted by a base plate 28a, and a cover 28b covering the surface of the base plate 28a. The gear case 28 is fixed to the housing 21 by means of the fastening of bolts 29 screwed into the inboard end portion of the housing 21 from the surface of the cover 28b.

Figure 4:
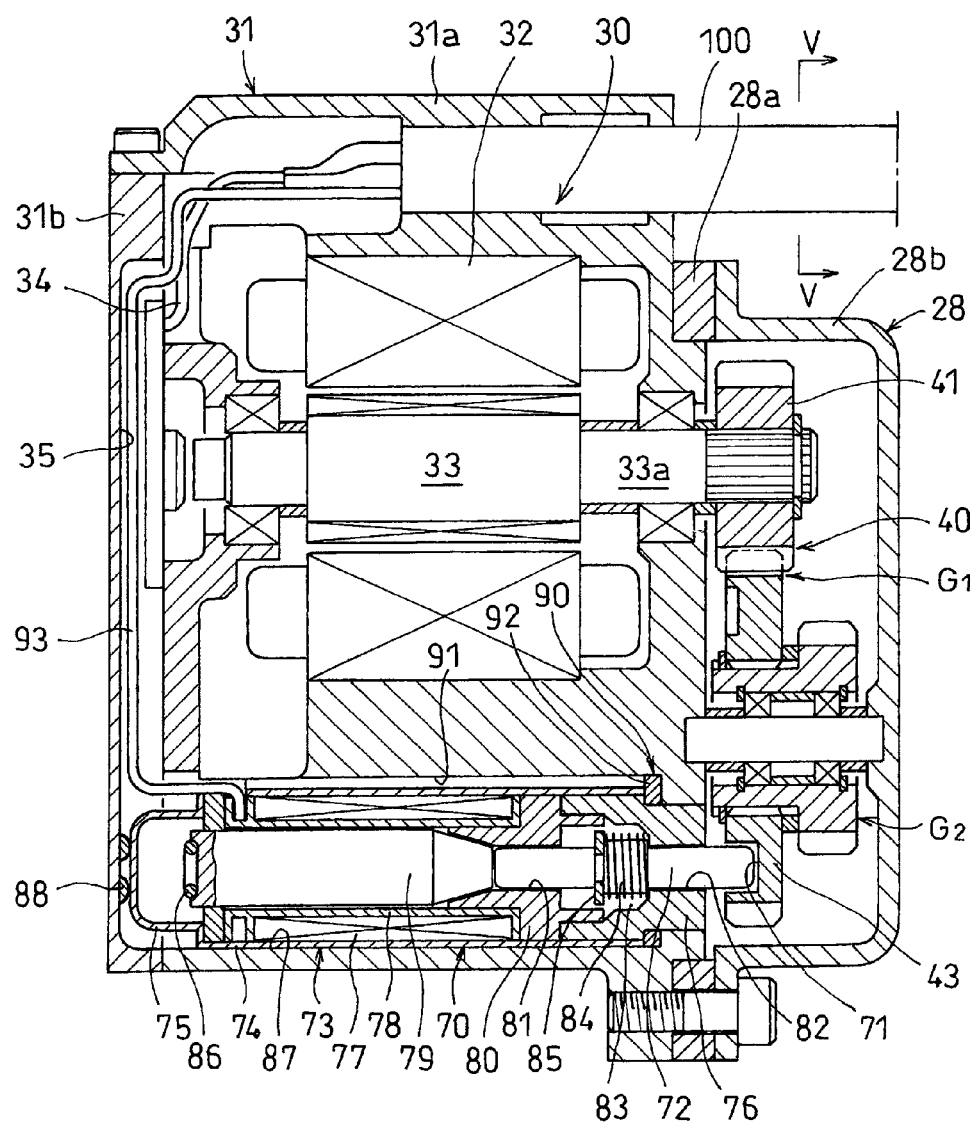
FIG. 4 is a sectional view taken along line IV-IV of FIG. 2.

As illustrated in FIG. 4, an electric motor 30 is supported by the base plate 28a of the gear case 28. The electric motor 30 includes a stator 32 incorporated in a motor case 31, and a rotor 33 incorporated inside of the stator 32. The rotation of a rotor shaft 33a of the rotor 33 is transmitted to the drive shaft 27 through a reduction gear mechanism 40 (power transmission path) incorporated in the gear case 28.

As illustrated in FIG. 1, a rotation-to-linear motion converting mechanism 50 is provided between the drive shaft 27 and the outer ring member 22, and the rotational motion of the drive shaft 27 is converted to the axial linear motion of the outer ring member 22 in the rotation-to-linear motion converting mechanism 50.

The rotation-to-linear motion converting mechanism 50 includes planetary rollers 51 incorporated between the outer ring member 22 and the drive shaft 27, and each formed in its outer periphery with a helical groove 53 in which a helical rib 52 formed on the inner periphery of the outer ring member 22 engages, the helical groove 53 having the same pitch as the helical rib 52, whereby when the drive shaft 27 rotates due to the contact of the planetary rollers 51 with the drive shaft 27, the respective planetary rollers 51 rotate about their axes while revolving around the drive shaft 27, thereby moving the outer ring member 22 in the axial direction. The helical groove 53 of each planetary roller 51 may be replaced by a plurality of circumferential grooves axially equidistantly spaced apart from each other and having the same pitch as the helical rib 52.

The planetary rollers 51 are rotatably supported by a carrier 54 supported so as to be rotatable about the drive shaft 27. The carrier 54 includes a pair of outboard and inboard disks 54a, 54b axially opposed to each other, and a plurality of space adjusting members 54c provided on the outer peripheral portion of one surface of the disk 54a so as to extend toward the disk 54b and to be circumferentially spaced apart from each other. The disks 54a and 54b are coupled together by means of the fastening of screws 55 screwed into the end surfaces of the respective space adjusting members 54c.

The disks 54a and 54b are rotatably supported by sliding bearings 56 incorporated, respectively, between the disk 54a and the drive shaft 27 and between the disk 54b and the drive shaft 27. The sliding bearing 56 rotatably supporting the outboard disk 54a is prevented from separating by a washer 57 fitted at the end portion of the drive shaft 27 and a snap ring 58 attached at the end portion of the drive shaft 27.

Each of the disks 54a and 54b is formed with circumferentially spaced apart shaft inserting holes 59 in the form of elongated holes each axially opposed to the corresponding hole 59 formed in the other of the disks 54a and 54b. The respective planetary rollers 51 are rotatably supported by a plurality of roller shafts 60 each having both end portions slidably supported in the corresponding axially opposed pair of shaft inserting holes 59.

Elastic rings 61 are wrapped around both end portions of the respective roller shafts 60 such that the roller shafts 60 are radially inwardly biased by the elastic rings 61, thereby bringing the planetary rollers 51 into pressure contact with the outer diameter surface of the drive shaft 27.

From the side of the planetary rollers 51, a thrust bearing 62, a pressure applying plate 63, and a pressure receiving plate 64 are incorporated between the inboard disk 54 of the carrier 54 and the portion of each planetary roller 51 axially opposed to the inboard disk 54b. The pressure applying plate 63 is in contact with the pressure receiving plate 64 through their respective spherical seats 65. A gap is defined between the fitting surfaces of the pressure receiving plate 64 and the corresponding roller shaft 60. The pressure applying plate 63 and the pressure receiving plate 64 are alignable within the gap.

A backup plate 66 and a thrust bearing 67 are incorporated between the inboard disk 54b of the carrier 54 and the shaft supporting member 24, rotatably supporting the rotary shaft 27. A bearing race 68 of the thrust bearing 67 is supported by the shaft supporting member 24 such that the bearing 67 is immovable in the axial direction. The thrust bearing 67 thus supports the axial reaction force applied to the carrier 54 from the outer ring member 22 through the planetary rollers 51.

As illustrated in FIG. 1, the outboard opening of the housing 21 is closed by a bellows 69 incorporated between the outboard end portion of the outer ring member 22 and the housing 21.

As illustrated in FIGS. 2 and 4, in the reduction gear mechanism 40, the rotation of an input gear 41 attached to the rotor shaft 33a of the electric motor 30 is reduced in speed in a stepwise manner by first and second reduction gear trains G1 and G2, and transmitted to an output gear 42 attached to the end portion of the drive shaft 27 so as to rotate the rotary shaft 27. Also, an electric locking mechanism 70 is built in the motor case 31 so that the electric motor 30 and the electric locking mechanism 70 are unitized, the electric locking mechanism 70 being capable of keeping the reduction gear mechanism 40 in the locked state in which power cannot be transmitted, while the vehicle is parked.

As illustrated in FIG. 4, the motor case 31 is constituted by a case body 31a, and a detachable lid 31b closing the opening of the case body 31a. After the electric locking mechanism 70 is incorporated in the case body 31a, the lid 31b is attached to the case body 31a.

Figure 6:
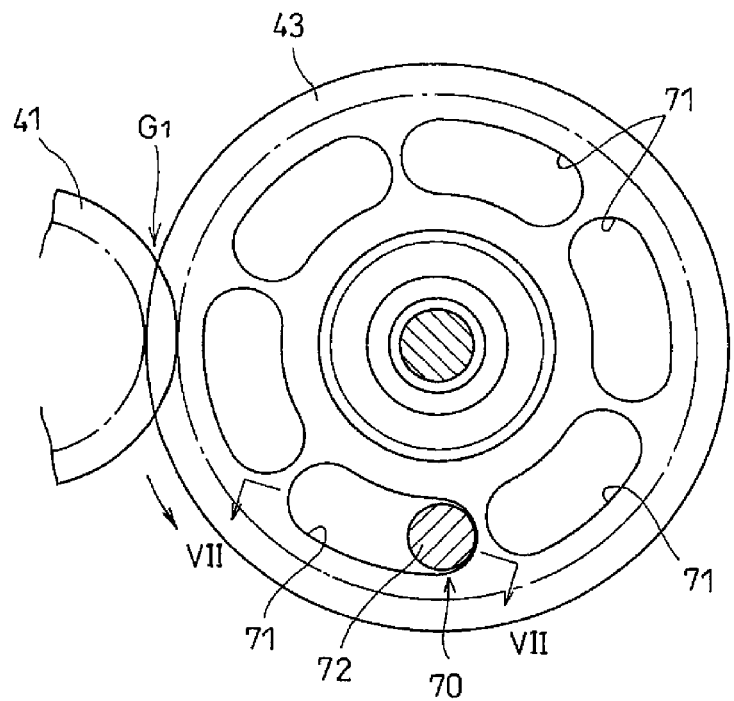
FIG. 6 is a longitudinal sectional view of the reduction gear mechanism illustrated in FIG. 4.
Figure 7:
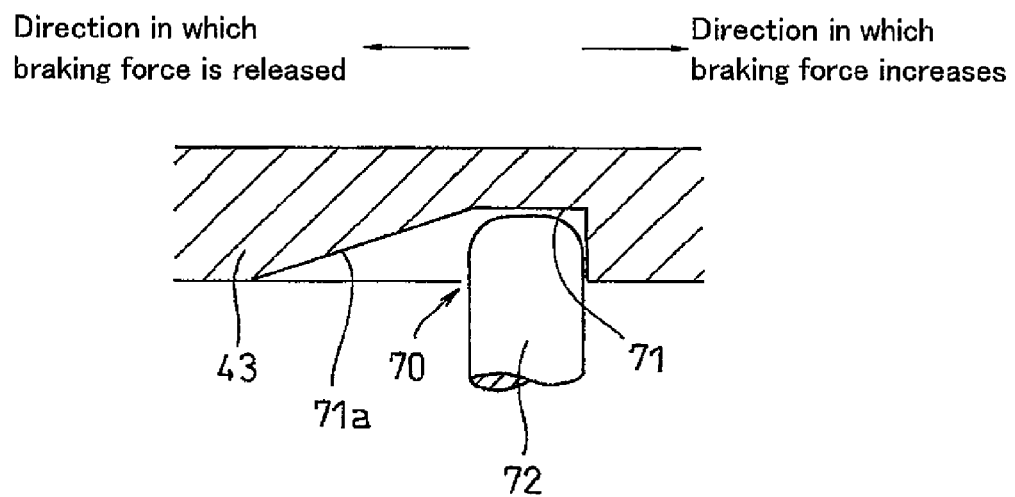
FIG. 7 is a sectional view taken along line VII-VII of FIG. 6.

As illustrated in FIGS. 4, 6, and 7, the electric locking mechanism 70 includes a plurality of circular arc-shaped engagement recesses 71 (engagement portions) formed in one side surface of an intermediate gear 43 (rotary member for transmitting power) located on the output side of the first reduction gear train $G_1$, the recesses 71 being arranged on a common circle so as to be equidistantly spaced apart from each other, a locking pin 72 movable toward and away from one point on the pitch circle of the engagement recesses 71, and a linear solenoid 73 for moving the locking pin 72 toward and away from the pitch circle, so that when the locking pin 72 engages in one of the engagement recesses 71, the intermediate gear 43 is locked.

Each engagement recess 71 formed in the intermediate gear 43 has two end surfaces circumferentially opposed to each other, and one of the two end surfaces is a tapered surface 71a which tends to cause the locking pin 72 to be retracted.

The linear solenoid 73 includes a cylindrical case 74 having on its tail side an opening closed by an end plate 75 and on its head side an opening closed by a head cap 76. A coil 77 is incorporated inside of the case 74, and a plunger 79 is slidably incorporated inside of a cylindrical bobbin 78 supporting the inner diameter surface of the coil 77.

A magnetic attraction core 80 is incorporated in the case 74 so as to be axially opposed to the head cap 76. Pin holes 81 and 82 are coaxially formed in the magnetic attraction core 80 and the head cap 76, respectively. The locking pin 72, formed separately from the plunger 79, is inserted in the pin holes 81 and 82 such that the locking pin 72 is slidably supported and guided in the pin holes 81 and 82 at two axially separate portions thereof, respectively.

A spring receiving space 83 is defined between the opposed surfaces of the head cap 76 and the magnetic attraction core 80. A return spring 84 incorporated in the spring receiving space 83 presses a snap ring 85 attached on the outer periphery of the locking pin 72, thereby biasing the locking pin 72 and the plunger 79 in the direction in which the locking pin 72 is disengaged.

The bobbin 78, supporting the coil 77, is made of resin or copper. The plunger 79 and the magnetic attraction core 80 are each made of a ferromagnetic material such that magnetic circuits are formed, respectively, between the coil 77 and the plunger 79 and between the coil 77 and the magnetic attraction core 80.

The locking pin 72 and the head cap 76 are each made of a nonmagnetic material so as to prevent the leakage of magnetism.

As illustrated in FIGS. 4 and 8(a), an elastic member 86 is provided on the tail surface of the plunger 79 opposed to the end plate 75. When the plunger 79 is moved backward toward the end plate 75 by the elastic force of the return spring 84, the elastic member 86 abuts the end plate 75 and elastically deforms. This elastic deformation alleviates the impact force generated when the elastic member 86 abuts the end plate 75.

The linear solenoid 73 configured as described above is fitted in a cylindrical, solenoid receiving hole 87 formed in the case body 31a. The lid 31b, closing the opening of the case body 31a, is provided on the inner surface of the lid 31b with an elastic member 88 for axially pressing the tail portion of the linear solenoid 73 so as to prevent the linear solenoid 73 from moving backward.

The elastic member 88 is made of rubber in this embodiment. However, the elastic member 88 may be a disk spring as illustrated in FIG. 8(b) or a wave spring as illustrated in FIG. 8(c).

As illustrated in FIG. 4, an anti-rotation means 90 for rotationally fixing the linear solenoid 73 is provided between the solenoid receiving hole 87 and the linear solenoid 73. The anti-rotation means 90 includes an axial engagement groove 91 formed in the inner periphery of the solenoid receiving hole 87, and an anti-rotation protrusion 92 formed on the outer periphery of the end portion on the head side of the linear solenoid 73. The linear solenoid 73 is rotationally fixed due to the engagement of the anti-rotation protrusion 92 in the engagement groove 91.

Power lines 34 of the electric motor 30 are connected to a single multicore cable 100 having an end portion supported by the motor case 31. Power lines 93 of the linear solenoid 73 extend in the engagement groove 91, and then in a line groove 35 formed in the inner surface of the lid 31b, and are connected to the multicore cable 100.

Figure 5:
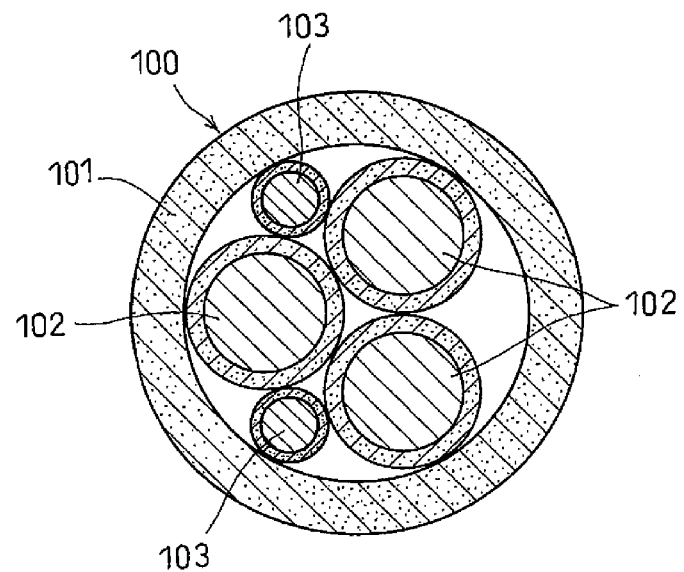
FIG. 5 is a sectional view taken along line V-V of FIG. 4.

As illustrated in FIG. 5, the multicore cable 100 includes three motor power lines 102, two solenoid power lines 103, and a single sheath 101 covering the motor power lines 102 and the solenoid power lines 103.

As illustrated in FIG. 2, not only the multicore cable 100 but also a signal cable 104 (cable for signal) is connected to the motor case 31, and a load sensor cable 105 (cable for load sensor) is connected to the housing 21. As illustrated in FIG. 1, the load sensor cable 105 is connected to a load detecting sensor 106 supported by the shaft supporting member 24.

The electric brake system of the embodiment is configured as described above. FIG. 4 illustrates the locked state in which the intermediate gear 43 is locked due to the engagement of the locking pin 72 in one of the engagement recesses 71. While the automobile is traveling, the locking pin 72 is out of any of the engagement recesses 71, so that the intermediate gear 43 is unlocked.

In the unlocked state in which the locking pin 72 is disengaged and thus the intermediate gear 43 is unlocked, when the electric motor 30 illustrated in FIG. 4 is activated, the rotation of the rotor shaft 33a of the electric motor 30 is transmitted to the drive shaft 27 illustrated in FIG. 1, after being reduced in speed in the reduction gear mechanism 40.

Since the outer diameter surfaces of the respective planetary rollers 51 are in elastic contact with the outer diameter surface of the drive shaft 27, when the drive shaft 27 rotates, due to the frictional contact of the planetary rollers 51 with the drive shaft 27, the respective planetary rollers 51 rotate about their axes while revolving around the drive shaft 27.

At this time, since the helical rib 52, formed on the inner diameter surface of the outer ring member 22, is engaged in the helical grooves 53, formed in the outer diameter surfaces of the respective planetary rollers 51, the outer ring member 22 axially moves due to the engagement of the helical rib 52 in helical grooves 53, so that the inboard brake pad 14, integrally coupled to the outer ring member 22, abuts the disk rotor 10 and begins to axially press the disk rotor 10. The reaction force generated by this pressing force moves the caliper 11 in the direction in which the outboard brake pad 13, attached to the claw portion 12, approaches the disk rotor 10, so that the outboard brake pad 13 abuts the disk rotor 10. As a result thereof, the outboard brake pad 13 and the inboard brake pad 14 strongly sandwich the outer peripheral portion of the disk rotor 10, thereby applying a braking force to the disk rotor 10.

When the vehicle is parked, with the disk rotor 10 sandwiched by the outboard and inboard brake disks 13 and 14 so that a braking force is applied to the disk rotor 10 as described above, the coil 77 of the linear solenoid 73 illustrated in FIG. 4 is energized, so that magnetic circuits are formed, respectively, between the coil 77 and the plunger 79 and between the coil 77 and the magnetic attraction core 80. Due to the magnetic attraction force applied to the plunger 79 from the magnetic attraction core 80, the plunger 79 moves toward the magnetic attraction core 80 so as to be attracted to the magnetic attraction core 80.

At this time, the plunger 79 presses the locking pin 72 so that the locking pin 72 advances toward the side surface of the intermediate gear 43. When the locking pin 72 advances, if the locking pin 72 is opposed to or aligned with one of the engagement recesses 71, the locking pin 72 engages in the one of the engagement recesses 71 as illustrated in FIG. 6, so that the intermediate gear 43 is locked. At this time, since the rotor shaft 33a of the electric motor 30 is also locked, it is possible to de-energize the electric motor 30 and the linear solenoid 73, thereby reducing the wasteful consumption of electric energy.

When the locking pin 72 advances, if the locking pin 72 is opposed to or aligned with none of the engagement recesses 71, the locking pin 72 can engage in none of the engagement recesses 71. In this case, with the locking pin 72 kept in its advanced position, the electric motor 30 is driven so as to rotate the intermediate gear 43 in the direction in which the braking force increases (direction shown by the arrow in FIG. 6) until the locking pin 72 is opposed to or aligned with one of the engagement recesses 71, thereby enabling the locking pin 72 to engage in the one of the engagement recesses 71.

While the intermediate gear 43 is locked due to the engagement of the locking pin 72 in one of the engagement recesses 71 as described above, namely, while the rotor shaft 33a of the electric motor 30 is locked, the reaction force from the disk rotor 10 acts on the respective gears of the reduction gear mechanism 40 as a rotational force by which the braking force is released. As a result thereof, a moment load tending to tilt the locking pin 72 is applied to the locking pin 72.

At this time, however, since the locking pin 72 is slidably supported, at two axially separate portions thereof, in the pin hole 81, formed in the magnetic attraction core 80, and the pin hole 82, formed in the head cap 76, the moment load applied to the locking pin 72 from the intermediate gear 43 is dispersedly received by the pin hole 81 of the magnetic attraction core 80 and the pin hole 82 of the head cap 76, and thus will do no damage to the inner diameter surfaces of the pin holes 81 and 82.

In order to unlock the rotor shaft 33a of the electric motor 30, the electric motor 30 is driven so as to rotate the intermediate gear 43 in the direction illustrated in FIG. 7 in which the braking force increases. When the intermediate gear 43 is rotated in this direction, the locking pin 72 is disengaged from one side surface of the engagement recess 71, so that due to the pressing action of the return spring 84 or due to the pressing action of the tapered surface 71a, i.e., the other side surface of the one of the engagement recesses 71 by which the distal end portion of the locking pin 72 is pressed, the locking pin 72 moves backward until the locking pin 72 reaches the disengaging position in which the locking pin 72 is out of the engagement recess 71.

At this time, the plunger 79 abuts the end plate 75. This abutment elastically deforms the elastic members 86 and 88, and the elastic deformation of the elastic members 86 and 88 absorbs the impact force generated when the plunger 79 abuts the end plate 75.

In the electric linear motion actuator 20 of the embodiment, as illustrated in FIG. 4, since the electric locking mechanism 70 is built in the motor case 31 of the electric motor 30 so that the electric motor 30 and the electric locking mechanism 70 are unitized, the attachment of the electric motor 30 and the electric locking mechanism 70 to the actuator 20 is performed at the same time. Therefore, it is possible to assemble the electric linear motion actuator 20 very easily.

Since the electric locking mechanism 70 is received in the motor case 31, by performing waterproof treatment to the electric motor 30, the electric locking mechanism 70 is also made waterproof. As a result thereof, it is not necessary to separately perform waterproof treatment to the electric locking mechanism 70, thus making it possible to reduce costs.

As illustrated in FIG. 4, since the power lines 34 of the electric motor 30 and the power lines 93 of the electric locking mechanism 70 are connected to the single multicore cable 100 so as to simplify the arrangement (layout) of the respective lines, it is possible to assemble the electric linear motion actuator 20 more easily.

Since the axial engagement groove 91 is formed in the solenoid receiving hole 87, and the anti-rotation protrusion 92, formed at the end portion of the linear solenoid 73 engages in the engagement groove 91 so as to rotationally fix the linear solenoid 73, it is possible to prevent the torsion of the power lines 93, connected to the linear solenoid 73, and thus to prevent the disconnection of the power lines 93.

In the anti-rotation means 90 as described above, since the power lines 93 of the linear solenoid 73 extends in the engagement groove 91, it is possible to effectively utilize the engagement groove 91.

DESCRIPTION OF REFERENCE NUMERALS

10: disk rotor
13: brake pad
14: brake pad
20: electric linear motion actuator
22: outer ring member (sliding member)
27: drive shaft
30: electric motor
31: motor case
34: power line
40: reduction gear mechanism (power transmission path)
43: intermediate gear (rotary member for transmitting power)
50: rotation-to-linear motion converting mechanism
70: electric locking mechanism
71: engagement recess (engagement portion)
72: locking pin
73: linear solenoid
87: solenoid receiving hole
88: elastic member
90: anti-rotation means
91: engagement groove
92: anti-rotation protrusion
93: power line
100: multicore cable

The invention claimed is:
1. An electric linear motion actuator comprising:
an electric motor having a motor case;

a drive shaft configured to be rotated by the electric motor;

a rotation-to-linear motion converting mechanism configured to convert a rotational motion of the drive shaft to an axial linear motion of an axially movably supported sliding member;

an electric locking mechanism incorporated in a power transmission path through which power is transmitted from the electric motor to the drive shaft; and an anti-rotation arrangement, wherein the locking mechanism is configured, when energized, to shift the power transmission path to a locked state in which power cannot be transmitted through the power transmission path, and configured, when de-energized thereafter, to keep the power transmission path in the locked state, wherein the electric locking mechanism is built in the motor case of the electric motor so that the electric motor and the electric locking mechanism are unitized, wherein the electric locking mechanism resides in a receiving hole in a first surface of the motor case, wherein the electric locking mechanism comprises:

a locking pin movable toward and away from one point on a rotation trajectory circle of an engagement portion formed in a side surface of a rotary member for transmitting power; and a linear solenoid configured to move the locking pin toward and away from said one point, and wherein the anti-rotation arrangement is provided between the linear solenoid and the motor case, and comprises:

an axial engagement groove formed in an inner periphery of a solenoid receiving hole formed in the motor case; and an anti-rotation protrusion formed on an outer periphery of the linear solenoid and engaged in the engagement groove.

2. The electric linear motion actuator according to claim 1, further comprising an elastic member provided in an interior of the motor case, and configured to axially press a tail portion of the linear solenoid so as to prevent the linear solenoid from moving backward.

3. The electric linear motion actuator according to claim 2, wherein the elastic member comprises one of a member made of rubber, a disk spring, and a wave spring.

4. An electric brake system comprising:

a brake pad;

a disk rotor; and the electric linear motion actuator according to claim 3, configured to linearly drive the brake pad such that the brake pad is pressed against the disk rotor, thereby applying a braking force to the disk rotor.

5. The electric linear motion actuator according to claim 2, wherein the elastic member is provided on a second surface of the motor case that is orthogonal to the first surface of the motor case.

6. The electric linear motion actuator according to claim 5, wherein the motor case includes a lid, and the second surface is an inner surface of the lid.

7. An electric brake system comprising:

a brake pad;

a disk rotor; and the electric linear motion actuator according to claim 2, configured to linearly drive the brake pad such that the brake pad is pressed against the disk rotor, thereby applying a braking force to the disk rotor.

8. The electric linear motion actuator according to claim 1, wherein the electric motor and the electric locking mechanism include, respectively, power lines connected to a single multicore cable.

9. The electric linear motion actuator according to claim 8, wherein the electric locking mechanism comprises:

a locking pin movable toward and away from one point on a rotation trajectory circle of an engagement portion formed in a side surface of a rotary member for transmitting power; and a linear solenoid configured to move the locking pin toward and away from said one point.

10. An electric brake system comprising:

a brake pad;

a disk rotor; and the electric linear motion actuator according to claim 8, configured to linearly drive the brake pad such that the brake pad is pressed against the disk rotor, thereby applying a braking force to the disk rotor.

11. The electric linear motion actuator according to claim 1, wherein a power line of the electric locking mechanism comprises a power line of the linear solenoid extending in the engagement groove.

12. The electric linear motion actuator according to claim 11, further comprising an elastic member provided in an interior of the motor case, and configured to axially press a tail portion of the linear solenoid so as to prevent the linear solenoid from moving backward.

13. An electric brake system comprising:

a brake pad;

a disk rotor; and the electric linear motion actuator according to claim 11, configured to linearly drive the brake pad such that the brake pad is pressed against the disk rotor, thereby applying a braking force to the disk rotor.

14. An electric brake system comprising:

a brake pad;

a disk rotor; and the electric linear motion actuator according to claim 1, configured to linearly drive the brake pad such that the brake pad is pressed against the disk rotor, thereby applying a braking force to the disk rotor.

* * * * *